US008196058B2

(12) United States Patent
Saitoh

(10) Patent No.: US 8,196,058 B2
(45) Date of Patent: Jun. 5, 2012

(54) IMAGE PROCESSING APPARATUS AND IMAGE DATA LIST DISPLAY METHOD

(75) Inventor: Tatsuhiko Saitoh, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 558 days.

(21) Appl. No.: 11/514,981

(22) Filed: Sep. 5, 2006

(65) Prior Publication Data
US 2007/0229491 A1    Oct. 4, 2007

(30) Foreign Application Priority Data
Mar. 30, 2006    (JP) .................................. 2006-094834

(51) Int. Cl.
*G06F 3/048*    (2006.01)

(52) U.S. Cl. ........ 715/778; 715/730; 715/731; 715/732; 715/739; 715/810; 715/838

(58) Field of Classification Search ................... 715/778
See application file for complete search history.

(56) References Cited

U.S. PATENT DOCUMENTS

| 7,437,681 | B2 * | 10/2008 | Misawa et al. ................ 715/835 |
| 2002/0097275 | A1 * | 7/2002 | Kobayashi et al. ........... 345/810 |
| 2002/0186258 | A1 * | 12/2002 | Shibata ........................ 345/838 |
| 2003/0156479 | A1 | 8/2003 | Fujiyoshi |
| 2006/0267970 | A1 | 11/2006 | Minakuchi |
| 2010/0293221 | A1 * | 11/2010 | Sidman et al. ................ 709/203 |

FOREIGN PATENT DOCUMENTS

| JP | A-2003-308198 | 10/2003 |
| JP | A-2003-308200 | 10/2003 |
| JP | A 2004-172867 | 6/2004 |
| JP | A-2006-332868 | 12/2006 |

OTHER PUBLICATIONS

Dec. 2, 2010 Japanese Office Action issued in JP-2006-094834 (with Translation).

* cited by examiner

*Primary Examiner* — Dennis-Doon Chow
*Assistant Examiner* — Anil Kumar
(74) *Attorney, Agent, or Firm* — Oliff & Berridge, PLC

(57) ABSTRACT

An image processing apparatus includes an image data storage unit, an operation unit, a generation unit, a display unit and a control unit. The image data storage unit stores plural pieces of image data. The operation unit allows a user to input an instruction. The generation unit outputs one of a first list of the stored image data in a first display form and a second list of the stored image data in a second display form according to the instruction. The control unit controls the display unit to display the one. When the generation unit switches from outputting the one to outputting the other in accordance with the input instruction, the control unit controls the display unit to display the other so that image data, which is displayed at a particular position in a previous display form, is displayed at a particular position in a current display form.

13 Claims, 8 Drawing Sheets

FIG. 5A
LIST FORM

FIG. 5B
THUMBNAIL FORM

*FIG. 6A*

LIST FORM

*FIG. 6B*

THUMBNAIL FORM

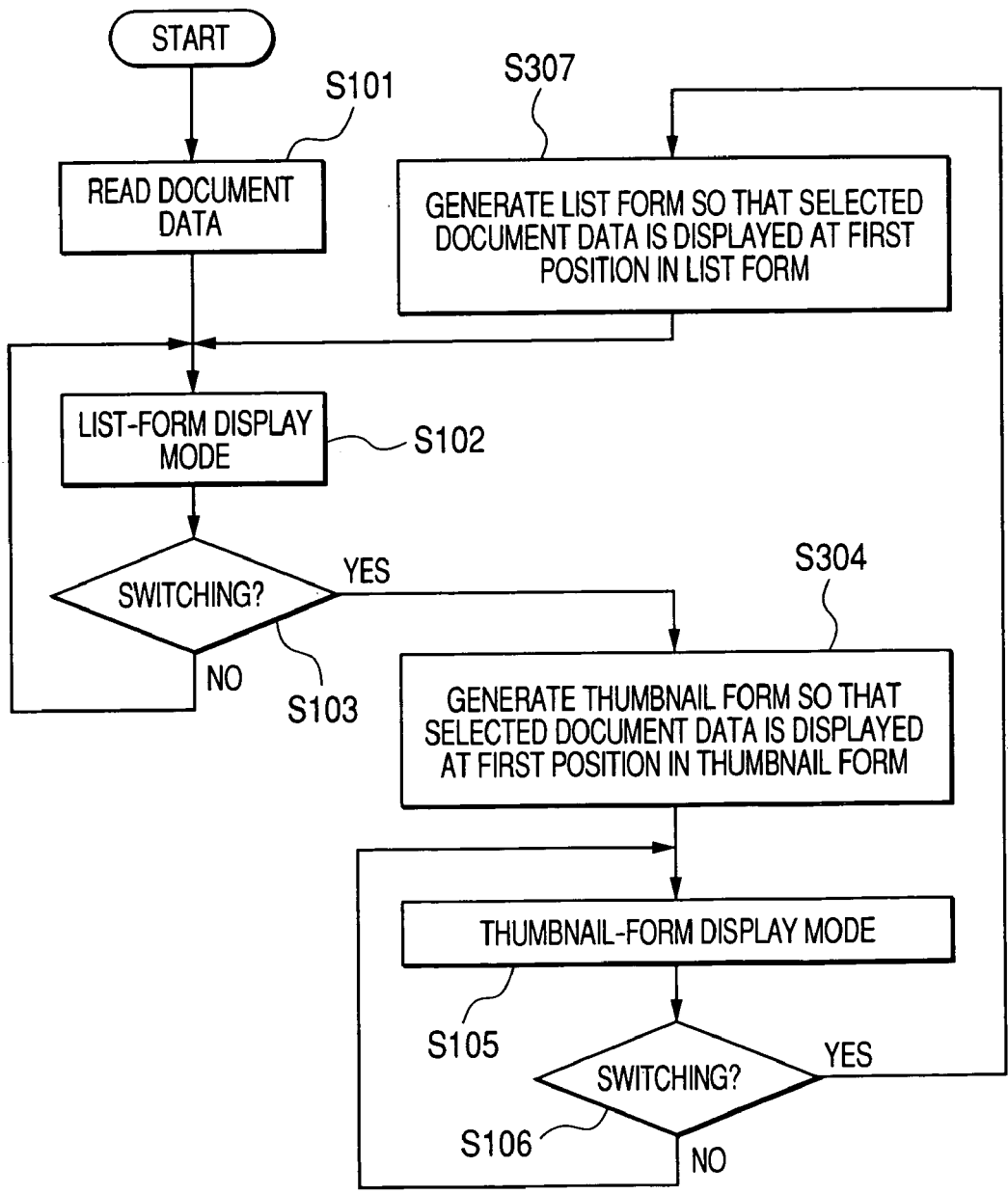

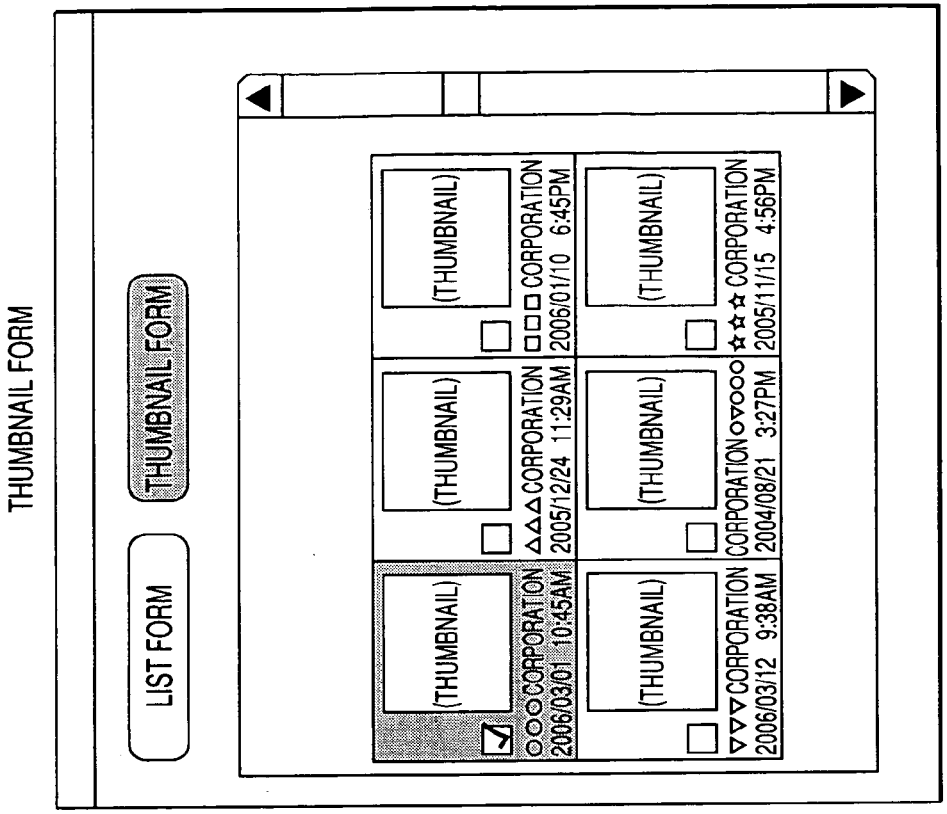

IMAGE PROCESSING APPARATUS AND IMAGE DATA LIST DISPLAY METHOD

BACKGROUND

1. Technical Field

The invention relates to image processing apparatus such as a copier, a facsimile machine, and a printer. In particular, the invention relates to a method for displaying a list of plural pieces of stored image data while switching between a list form and a thumbnail form.

2. Description of the Related Art

Multi-function copiers that function as various apparatus such as a scanner, a facsimile machine, and a printer can not only print read-in image data but also designate stored image data to perform on the designated image data such image processing as re-printing, image combining, or page editing (insertion or deletion). In performing such operation, displaying a list of stored image data allows a user to select (designate) image data he or she wants to manipulate.

In general, a list-form display method and a thumbnail-form display method are available as a method for displaying a list of stored image data.

The list form (or ladder form) is a display form in which only a list of plural pieces of image information such as a document name and a registration date and time is displayed. The thumbnail form is a display form in which rough, reduced images of image data are displayed together with their image information.

Although the list-form display method can display a lot of image data together, it is difficult for a user to understand the contents of displayed image data because the user is obliged to judge the contents of each image data on the basis of only such information as an amount of data and a recording date and time. On the other hand, although the thumbnail-form display method allows a user to understand the contents of image data because of display of their reduced images, the number of image data that can be displayed together is smaller than in the list-form display method.

SUMMARY

According to an aspect of the invention, an image processing apparatus includes an image data storage unit, an operation unit, a generation unit, a display unit and a control unit. The image data storage unit stores plural pieces of image data. The operation unit allows a user to input an instruction. The generation unit outputs one of a first list of the stored image data in a first display form and a second list of the stored image data in a second display form in accordance with the input instruction. The control unit controls the display unit to display the one of the first and second lists output from the generation unit. When the generation unit switches from outputting the one of the first and second lists to outputting the other in accordance with the input instruction, the control unit controls the display unit to display the other of the first and second lists so that image data, which is displayed at a particular position in a previous display form, is displayed at a particular position in a current display form.

BRIEF DESCRIPTION OF THE DRAWINGS

Exemplary embodiments of the invention will be described in detail based on the following figures, wherein:

FIGS. 5A and 5B show an example of displaying lists of document data on a display unit 32 in the image processing apparatus according to the first exemplary embodiment of the invention;

FIGS. 6A and 6B show an example of displaying lists of document data on a display unit 32 in an image processing apparatus according to a second exemplary embodiment of the invention;

FIG. 7 is a flowchart of a process which is executed by a display control section 36 of an image processing apparatus according to a third exemplary embodiment of the invention; and FIGS. 8A and 8B show an example of displaying lists of document data on a display unit 32 in the image processing apparatus according to the third exemplary embodiment of the invention.

DETAILED DESCRIPTION

Embodiments of the invention will be hereinafter described in detail with reference to the drawings.

First Exemplary Embodiment

Figure 1:
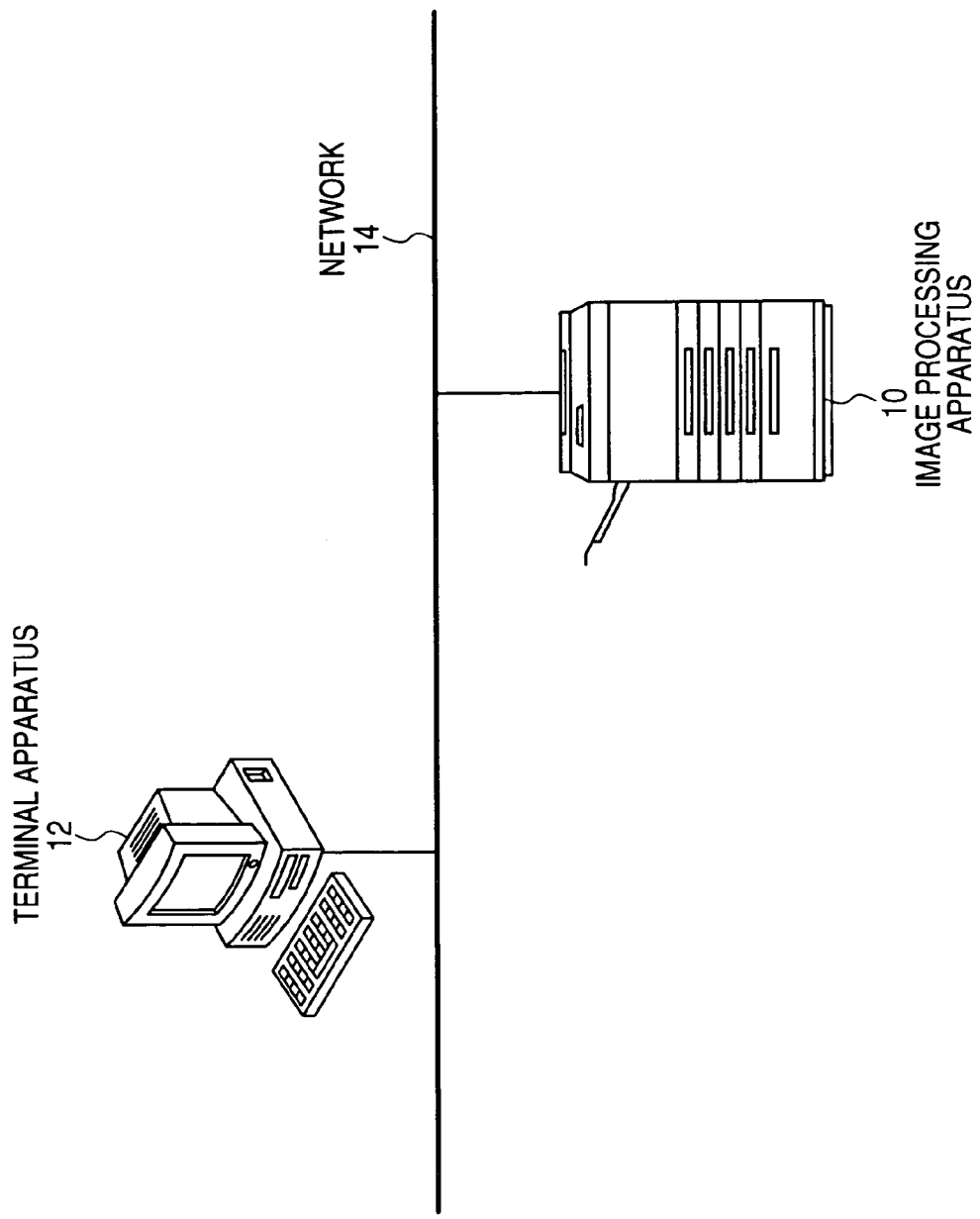
FIG. 1 shows the configuration of an image processing system including an image processing apparatus according to a first exemplary embodiment of the invention.

FIG. 1 shows the configuration of an image processing system including an image processing apparatus according to a first exemplary embodiment of the invention.

As shown in FIG. 1, the image processing system includes an image processing apparatus 10 and a terminal apparatus 12 which are connected to each other via a network 14. The terminal apparatus 12 generates print data of a print job or the like and sends the generated print data to the image processing apparatus 10. Receiving the print data sent from the terminal apparatus 12, the image processing apparatus 10 prints images on printing sheets on the basis of the print data. An example of the image processing apparatus 10 is a multi-function copier.

The multi-function copier as the image processing apparatus 10 is equipped with a storage device for storing a document to be copied and other information. During a copying operation, document information (image data and setting information) can be stored in the storage device. A storage destination can be selected from plural copy boxes, and hence documents can be stored so as to be arranged on a user-by-user basis.

Furthermore, a stored document can be designated and subjected to such a manipulation as re-printing, document combining, or page editing (insertion or deletion). In this case, displaying a list of stored documents allows a user to select (designate) a document he or she wants to manipulate.

Figure 2:
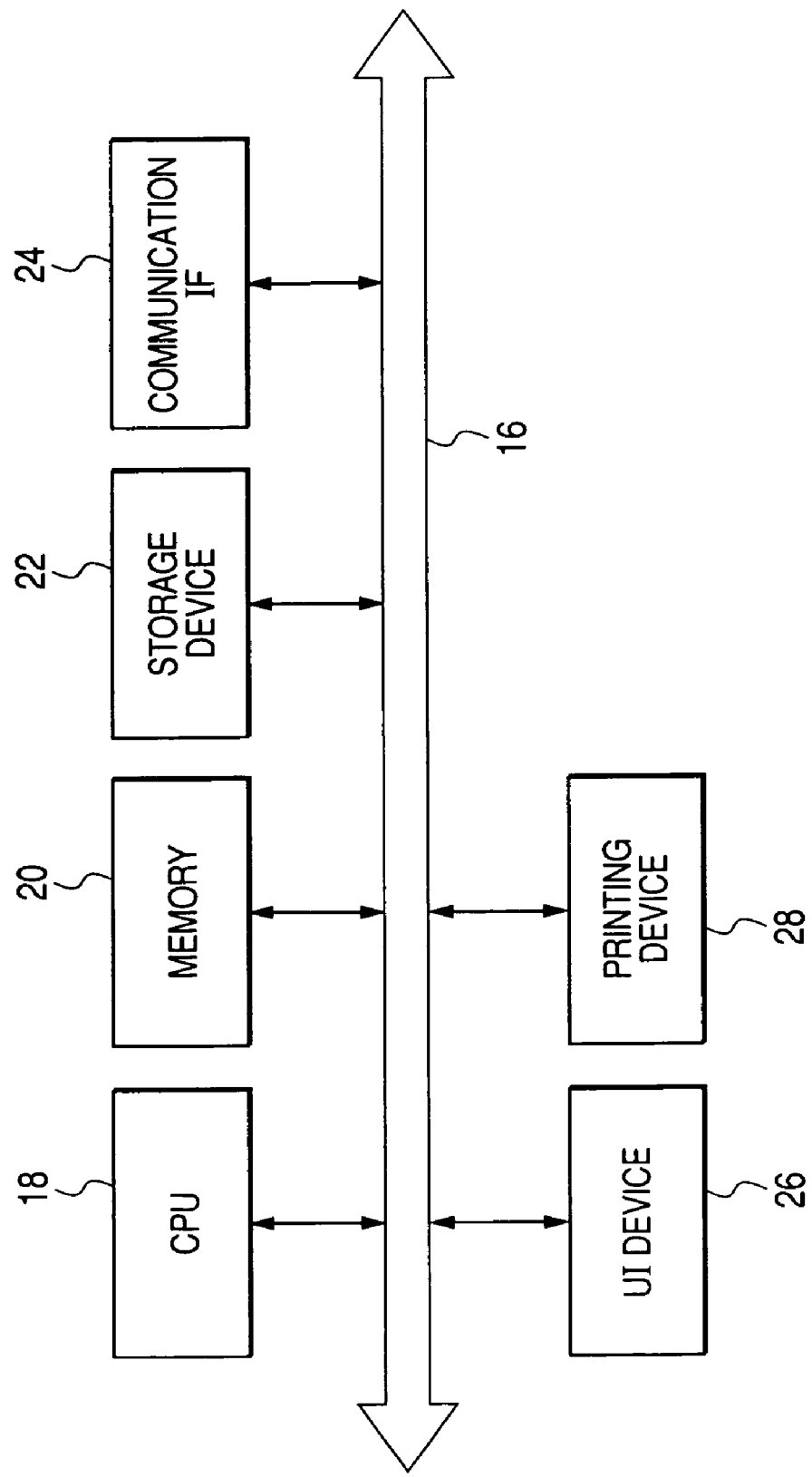
FIG. 2 shows the hardware configuration of the image processing apparatus according to the first exemplary embodiment of the invention.

FIG. 2 shows the hardware configuration of the image processing apparatus 10 according to the exemplary embodiment.

As shown in FIG. 2, the image processing apparatus 10 includes a CPU 18, a memory 20, a storage device 22 such as a hard disk drive (HDD), a communication interface (IF) 24 for sending and receiving data to and from external computers etc. over the network 14, a user interface (UI) device 26 including a liquid crystal display having a touch panel and a keyboard, and a printing device 28. These components are connected to each other via a control bus 16.

The CPU 18 controls operation of the image processing apparatus 10 by performing prescribed processing according to image processing programs stored in the memory 20 or the storage device 22.

Figure 3:
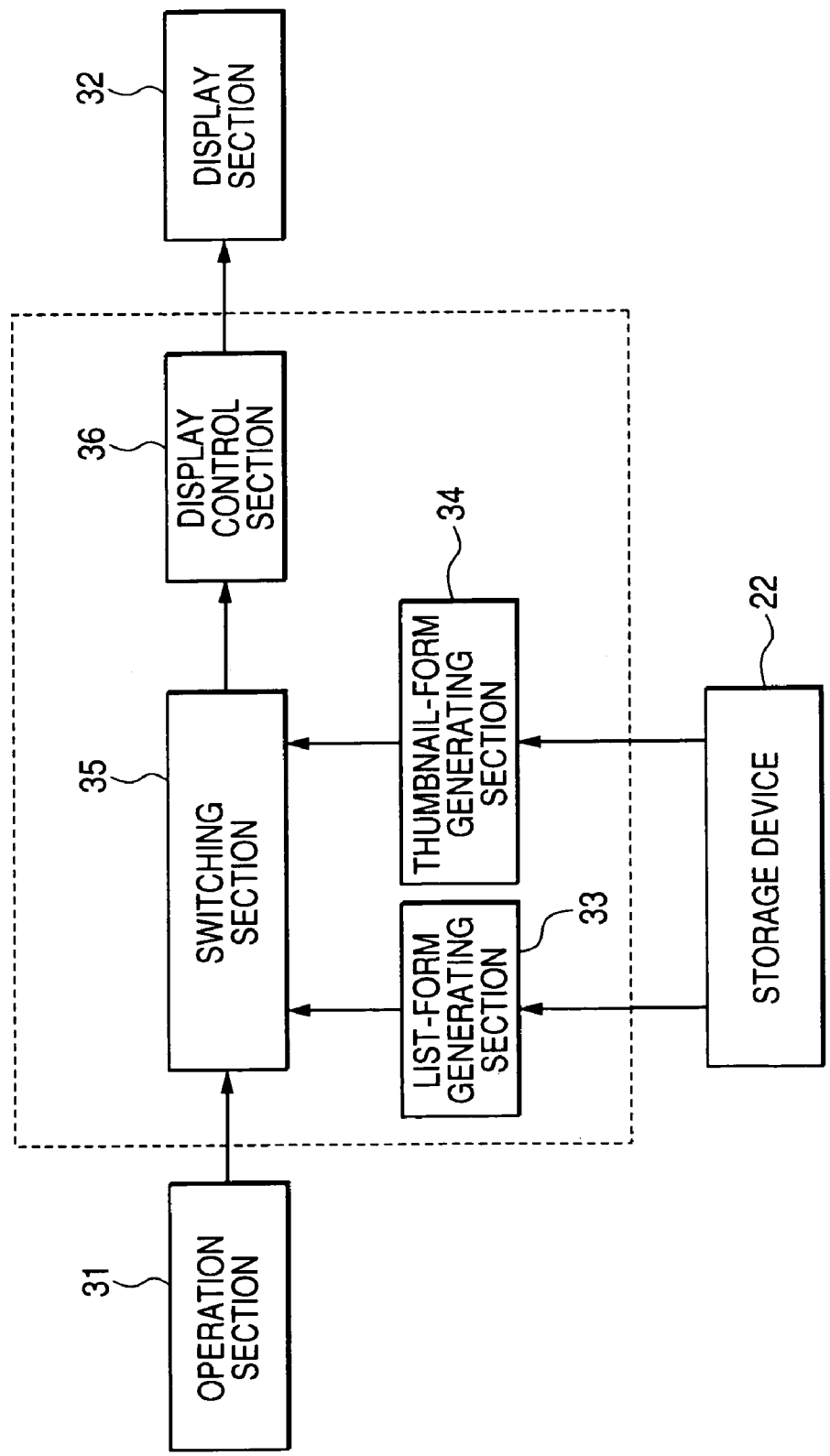
FIG. 3 is a block diagram showing the functional configuration of the image processing apparatus according to the first exemplary embodiment of the invention.

FIG. 3 is a block diagram showing the functional configuration of the image processing apparatus 10 which is implemented by running the above-mentioned image processing programs.

The image processing apparatus 10 according to the exemplary embodiment includes a list-form generating section 33, a thumbnail-form generating section 34, a switching section 35, and a display control section 36. A operation section 31 and a display unit 32 shown in FIG. 3 correspond to the UI device 26 shown in FIG. 2.

To simplify the description, other functions that are provided in a general image processing apparatus will not be described.

The storage device 22 is an HDD or memory and functions as an image data storage unit. Image data to be subjected to various kinds of image processing are stored in the storage device 22.

The display unit 32 is provided to display a list of plural pieces of image data stored in the storage device 22. The display unit 32 may be a display panel such as an LCD.

The operation section 31 includes various operation buttons, which are used for switching the display form of a list of plural pieces of image data on the display unit between the list (ladder) form and the thumbnail form, for selecting one of various kinds of processing, and for performing other operations.

The list-form generating section 33 generates a list of the image data stored in the storage section 22 in the list form.

The thumbnail-form generating section 34 generates a list of the image data stored in the storage section 22 in the thumbnail form.

The switching section 35 switches between the list in the list form generated by the list-form generating section 33 and the list in the thumbnail form generated by the thumbnail-form generating section 34 according to a switching instruction supplied from the operation section 31. Then, the switching section 35 outputs the thus selected list to the display control section 36.

According to this configuration, the image processing apparatus 10 according to the exemplary embodiment can switch the display form between the list form and the thumbnail form in displaying a list of the plural pieces of image data stored in the storage device 22.

For example, in the initial setting state, a setting is made so that a list is produced in the list form. In this case, in the initial setting state, the switching section 35 selects and outputs the list in the list form generated by the list-form generating section 33 to the display control section 36. As a result, the display control section 36 causes the display unit 32 to display the list of the image data in the list form thereon.

If a user selects the thumbnail form by operating the operation section 31, the switching section 35 outputs the list of the image data in the thumbnail form generated by the thumbnail-form generating section 34 to the display control section 36. As a result, the display control section 36 causes the display unit 32 to display the list of the image data in the thumbnail form.

In the image processing apparatus 10 according to the exemplary embodiment, if the display form of the list, which is output from the switching section 35, is switched, the display control section 36 causes the display unit 32 to display a list of image data so that image data, which was displayed at the first position in the previous display form, is kept displayed at the first position in the current display form.

Figure 4:
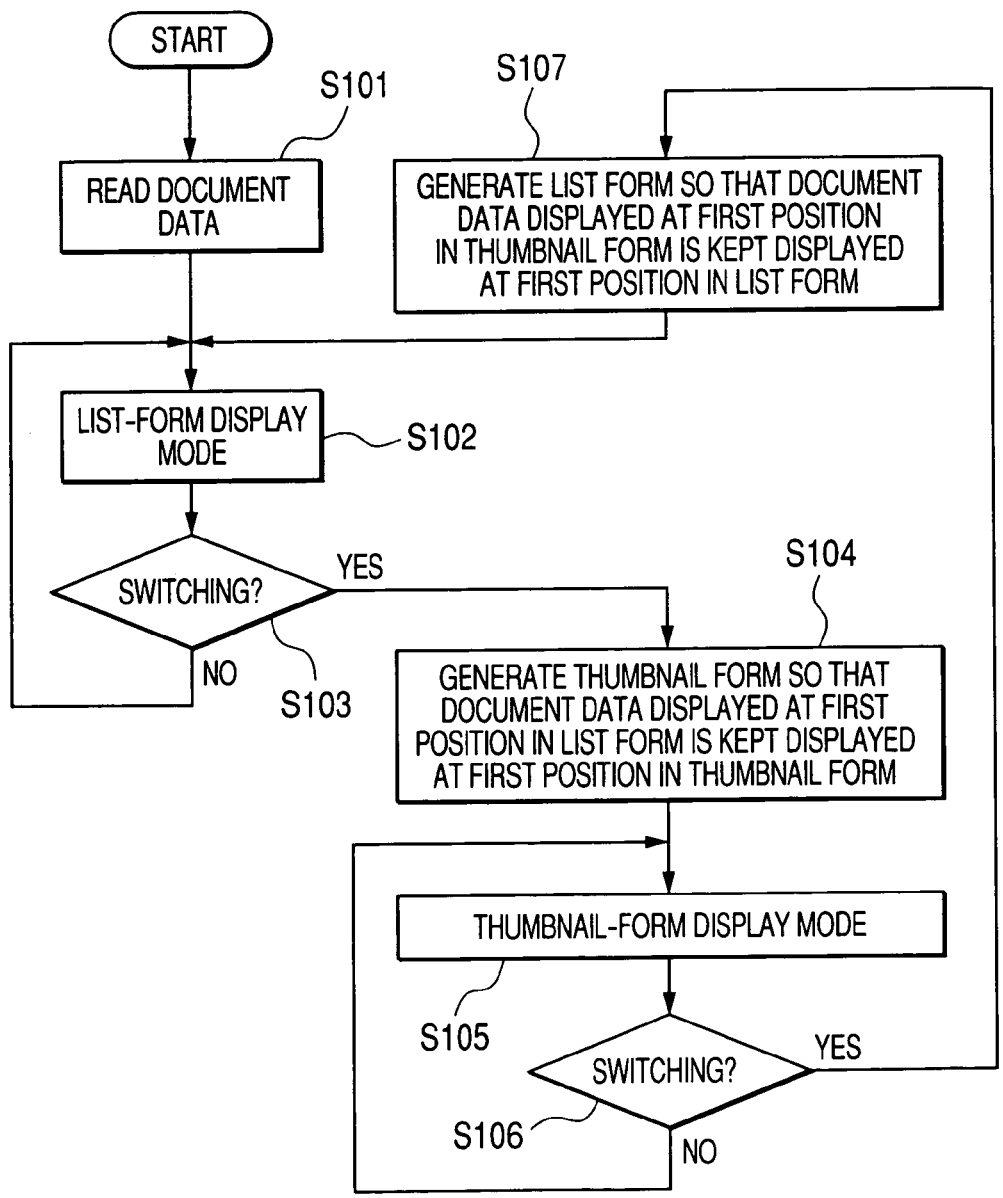
FIG. 4 is a flowchart of a process which is executed by a display control section 36 of the image processing apparatus according to the first exemplary embodiment of the invention.

FIG. 4 is a flowchart of a process, which is executed by the display control section 36 of this exemplary embodiment.

First, when an instruction to display a list of image data stored in the storage device 22 is given, at step S101 the list-form generating section 33 and the thumbnail-form generating section 34 read the image data to be displayed.

If the list-form display mode is set as an initial setting, the switching section 35 selects the list of the image data in the list form generated by the list-form generating section 33 and outputs the selected list to the display control section 36. As a result, the display mode is brought to be the list-form display mode (S102).

If an instruction to switch the display form is given through the operation section 31 in the list-form display mode (S103: yes), the switching section 35 selects the list of the image data in the thumbnail form generated by the thumbnail-form generating section 34 and outputs the selected list to the display control section 36.

At step S104, the display control section 36 causes the display unit 32 to display a list of image data so that image data, which was displayed at the first position in the list form, is kept displayed at the first position in the thumbnail form.

As a result, the display mode is switched from the list-form display mode to a thumbnail-form display mode (S105).

If an instruction to switch the display form is given through the operation section 31 in the thumbnail-form display mode (S106: yes), the switching section 35 selects the list of the image data in the list form generated by the list-form generating section 33 and outputs the selected list to the display control section 36.

At step S107, the display control section 36 causes the display unit 32 to display a list of image data so that the image data, which was displayed at the first position in the thumbnail form, is kept displayed at the first position in the list form.

Figures 5A, 5B:
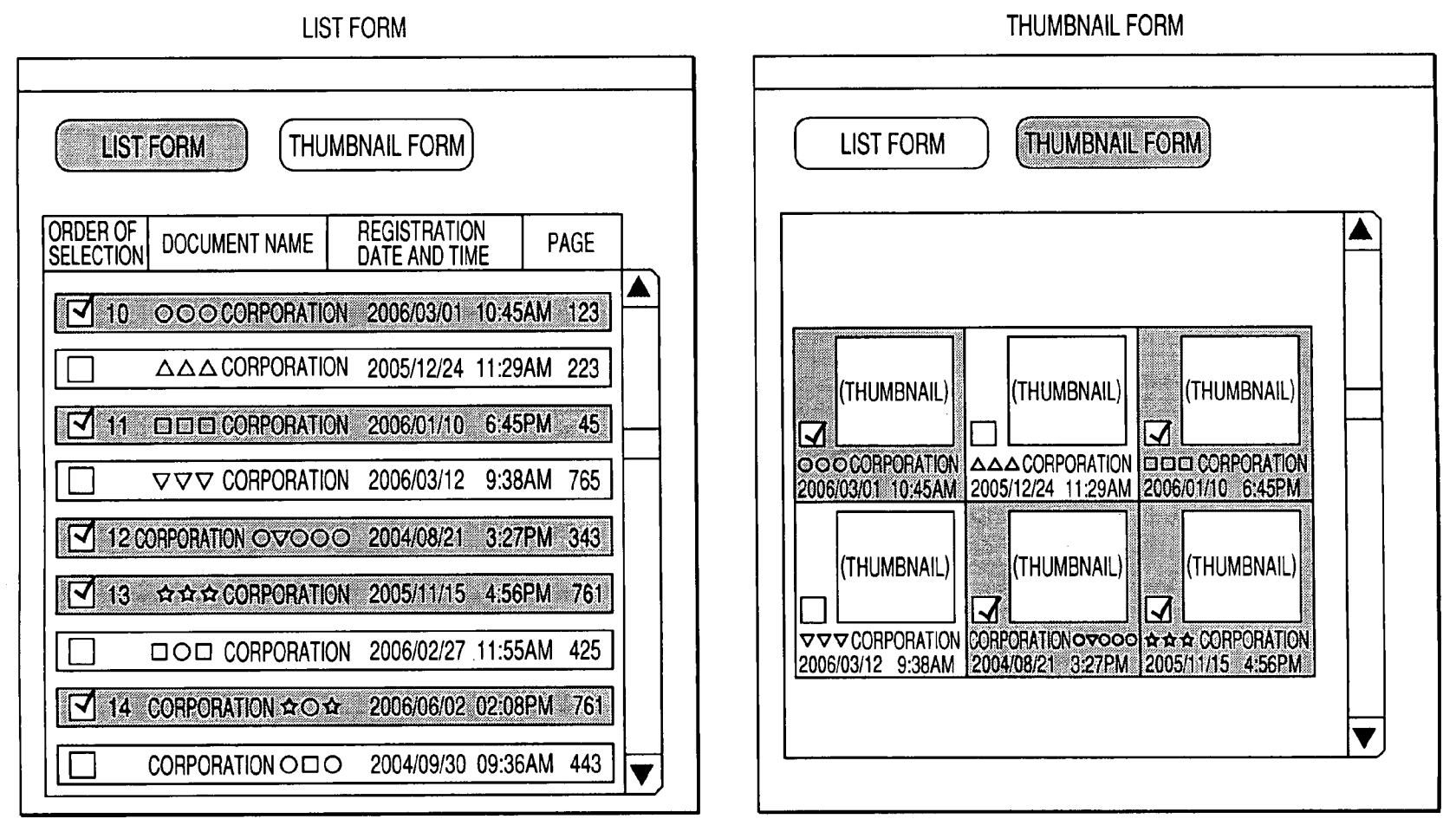

FIGS. 5A and 5B show an example of displaying lists of document data on the display unit 32 in the image processing apparatus 10 according to the exemplary embodiment.

By executing the above process, as shown in FIGS. 5A and 5B, the display control section 36 causes the display unit 32 to display a list of plural pieces of image data stored in the storage device 22 in such a manner that the same image data is displayed at the first position in both of the list form and the thumbnail form.

The following description will be directed to a case where the display unit 32 and the operation section 31 are implemented as a single operation panel and that the image data stored in the storage section 22 are document data.

In the list form shown in FIG. 5A, document data having a document name "OOO Cooperation," which was selected 10thly, is displayed at the first position. If an instruction to switch from the list form of FIG. 5A to a thumbnail form is given, the list in the thumbnail form shown in FIG. 5B is generated. Also in the thumbnail form of FIG. 5B, the document data having the document name "000 Cooperation," was selected 10thly, is displayed at the first position.

Second Exemplary Embodiment

Next, an image processing apparatus according to a second exemplary embodiment of the invention will be described.

The image processing apparatus according to this exemplary embodiment is approximately the same in configuration as the image processing apparatus 10 according to the first exemplary embodiment. The second exemplar embodiment is different from the first exemplar embodiment in the process executed by the display control section 36 (see FIG. 3). Therefore, the second exemplary embodiment will be described by referring to the above-described first exemplary embodiment.

In this exemplary embodiment, when the display form of the list, which is output from the switching section 35, is switched, the number of image data that are displayed on one page in the current display form is made the same as the number of image data, which is that were displayed on one page in the previous display form.

Figures 6A, 6B:
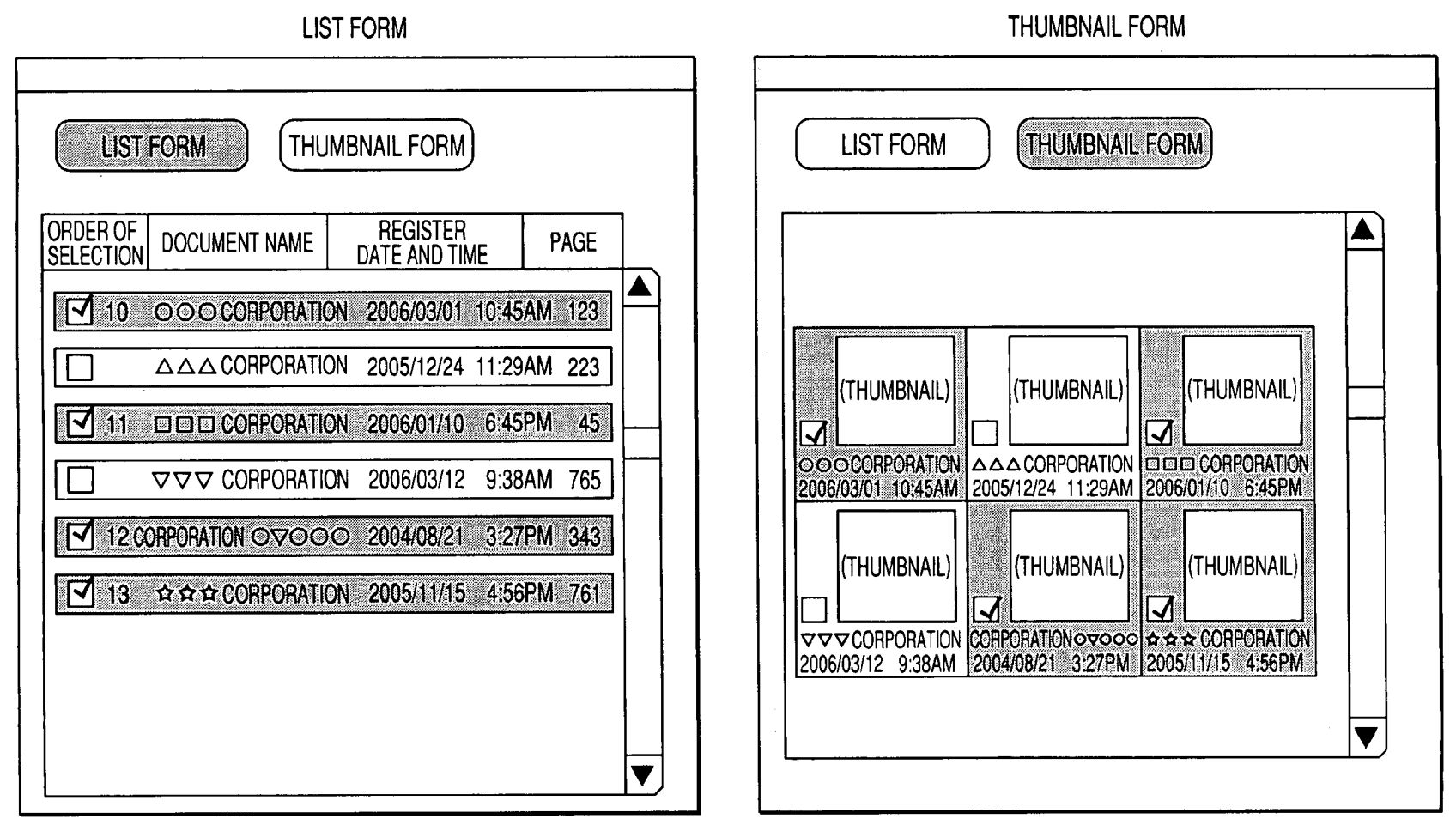

FIGS. 6A and 6B show an example of displaying lists of document data on the display unit 32 in the image processing apparatus according to the exemplary embodiment.

As shown in FIGS. 6A and 6B, the display control section 36 of the exemplary embodiment causes the display unit 32 to display the same number of document data on each page in the list form and in the thumbnail form in displaying a list of plural pieces of document data stored in the storage device 22.

Only six document data are displayed in a list-form list display shown in FIG. 6A. If switching is made from the list form of FIG. 6A to the thumbnail form, a list shown in FIG. 6B is generated. Six document data are also displayed in the thumbnail form of FIG. 6B; that is, the number of document data remains the same as in the list form.

In the list in the list form of FIG. 6A, more than six document data can be displayed as long as the display area is concerned. However, since the list in the thumbnail form of FIG. 6B can contain six document data at the maximum, in the list form of FIG. 6A the number of document data displayed is restricted to six.

Third Exemplary Embodiment

Next, an image processing apparatus according to a third exemplary embodiment of the invention will be described.

The image processing apparatus according to this exemplary embodiment is approximately the same in configuration as the image processing apparatus 10 according to the first exemplary embodiment. The third exemplary embodiment is different from the first exemplar embodiment in the process executed by the display control section 36 (see FIG. 3). Therefore, the third exemplary embodiment will be described by referring to the above-described first exemplary embodiment.

In the image processing apparatus according to this exemplary embodiment, when the display form the list, which is output from the switching section 35, is switched between the list form and the thumbnail form, the display control section 36 causes the display unit 32 to display a list of image data so that image data, which was selected in the previous display form, is displayed at the first position in the current display form.

FIG. 7 is a flowchart of a process, which is executed by the display control section 36 of the exemplary embodiment. In FIG. 7, the same steps as those in the process of FIG. 4 are given the same reference symbols and will not be described.

The flowchart of FIG. 7 is the same as the flowchart of FIG. 4 except that steps S104 and S107 of FIG. 4 are replaced by step S304 and S307, respectively.

That is, the process of this exemplary embodiment shown in FIG. 7 is different from the process of the first exemplary embodiment shown in FIG. 4 in that when the display form is switched between the list form and the thumbnail form, the display control section 36 displays one document data, which was selected in the previous display form, is displayed at the first position in the current display form (list form or thumbnail form).

FIGS. 8A and 8B show an example of displaying lists of document data on the display unit 32 in the image processing apparatus according to the exemplary embodiment.

In a list-form list display shown in FIG. 8A, nine document data are displayed and document data having a document name "000 Cooperation" that was selected 10thly is displayed as selected document data at the eighth position as counted from the first position. If an instruction to switch from the list form of FIG. 8A to a thumbnail form is given, a list in the thumbnail form shown in FIG. 8B is generated. In the thumbnail form of FIG. 8B, the document data having the document name "000 Cooperation" that was selected in the list form is displayed at the first position.

[Modifications]

In the first to third exemplary embodiments, image data that was displayed at the first position in the previous display form or image data that was selected in the previous display form is displayed at the first position in the current display form. However, the position where such particular image data should be displayed is not limited to the first position. The position where particular image data should be displayed after switching of the display form or the position where particular image data was displayed before switching of the display form is not limited to the first position but may be set to a particular position as long as a user is allowed to easily recognize a corresponding relationship between image data displayed before and after switching of the display form.

For example, in the thumbnail form, the top-left position is generally considered the first position. However, the top-right position may be considered the head position depending on the display method. Furthermore, depending on the display method, there may occur a case that displaying the same image data at the center or at the end, for example, in both display forms employed before and after display form switching allows a user to recognize a corresponding relationship between image data more easily.

Although in the above embodiments a list of image data is displayed while the display form of image data is switched between the list form and the thumbnail form, the invention is not limited to such a case. The invention can similarly be applied to a case that the display form of a list display of image data is switched between other display forms, for example, between the list form and the icon form.

[FIG. 1]
10: IMAGE PROCESSING APPARATUS
12: TERMINAL APPARATUS
14: NETWORK
[FIG. 2]
20: MEMORY
22: STORAGE DEVICE
24: COMMUNICATION IF
26: UI DEVICE
28: PRINTING DEVICE
[FIG. 4]
S101: READ DOCUMENT DATA.
S102: LIST-FORM DISPLAY MODE.
S103: SWITCHING?
S104: GENERATE THUMBNAIL FORM SO THAT DOCUMENT DATA DISPLAYED AT FIRST POSITION IN LIST FORM IS KEPT DISPLAYED AT FIRST POSITION IN THUMBNAIL FORM.
S105: THUMBNAIL-FORM DISPLAY MODE.
S106: SWITCHING?
S107: GENERATE LIST FORM SO THAT DOCUMENT DATA DISPLAYED AT FIRST POSITION IN THUMBNAIL FORM IS KEPT DISPLAYED AT FIRST POSITION IN LIST FORM.

[FIG. 7]
S101: READ DOCUMENT DATA.
S102: LIST-FORM DISPLAY MODE.
S103: SWITCHING?
S304: GENERATE THUMBNAIL FORM SO THAT SELECTED DOCUMENT DATA IS DISPLAYED AT FIRST POSITION IN THUMBNAIL FORM.
S105: THUMBNAIL-FORM DISPLAY MODE.
S106: SWITCHING?
S307: GENERATE LIST FORM SO THAT SELECTED DOCUMENT DATA IS DISPLAYED AT FIRST POSITION IN LIST FORM.

What is claimed is:

1. An image processing apparatus comprising:
an image data storage unit that stores plural pieces of image data, each piece of image data corresponding to one image;
an operation unit that allows a user to input an instruction;
a generation unit that outputs one of a first list of the stored image data in a first display form and a second list of the stored image data in a second display form in accordance with the input instruction, the first list of the stored image data including a first type of information for each piece of image data included in the first list, and the second list of the stored image data including said first type of information for each piece of image data included in the second list, one of the first list and the second list includes additional information, other than said first type of information, that is not included in the other of the second list and the first list;
a display unit that displays the one of the first and second lists in a window; and
a control unit that controls the display unit to display the one of the first and second lists output from the generation unit, wherein:
the first display form is the display of said each piece of the image data in list form and the second display form is the display of said each piece of image data in thumbnail image form,
when the generation unit switches from outputting the one of the first and second lists to outputting the other in accordance with the input instruction, the control unit controls the display unit to display the other of the first and second lists so that a piece of image data, which is displayed at a particular position in a previous display form, is displayed at a particular position in a current display form,
when only one piece of image data included in the one of the first and second lists, located at other than a first position of the one of the first and second lists, and displayed on the previous display form is selected and the generation unit switches from outputting the one of the first and second lists to outputting the other in accordance with the input instruction, the control unit controls the display unit to display the other of the first and second lists so that the selected piece of image data is displayed at the first position in the current display form, and
when (i) a certain piece of image data included in the first list and located at the other than the first position of the first list is selected and (ii) the generation unit switches from outputting the first list in the list form to outputting the second list in the thumbnail image form, the control unit controls the display unit to display the second list in the thumbnail form so that the selected certain piece of image data is displayed at a top-left position or a top-right position in the window as the first position in the thumbnail form.

2. The apparatus according to claim 1, wherein:
the generation unit comprises:
a first generation section that generates the first list of the stored image data in the first display form;
a second generation section that generates the second list of the stored image data in the second display form;
a switching section that switches between the first and second lists according to the input instruction to output the one of the first and second lists.

3. The apparatus according to claim 1, wherein:
the first list includes only said first type information for said each piece of image data, and
the second list includes the said first type information for said each piece of image data and the thumbnail image for said each piece of image data.

4. The apparatus according to claim 1, wherein:
the first list does not include a thumbnail image for said each piece of image data.

5. The apparatus according to claim 1, wherein
when the generation unit switches from outputting the one of the first and second lists to outputting the other in accordance with the input instruction, the control unit controls the display unit to display the other of the first and second lists so that number of pieces of image data in a previous display form is equal to number of pieces of image data in a current display form when one of the first and second lists overflows a range of displayable viewing area.

6. The apparatus according to claim 5, wherein:
the generation unit comprises:
a first generation section that generates the first list of the stored image data in the first display form;
a second generation section that generates the second list of the stored image data in the second display form;
a switching section that switches between the first and second lists according to the input instruction to output the one of the first and second lists.

7. The apparatus according to claim 5, wherein:
the first list includes only said first type information for said each piece of image data, and
the second list includes the said first type information for said each piece of image data and the thumbnail image for said each piece of image data.

8. The apparatus according to claim 5, wherein:
the first list does not include a thumbnail image for said each piece of image data.

9. An image processing method for switching a list of plural pieces of stored image data between a first display form and a second display form, the method performed by a processor device, each piece of image data corresponding to one image, the method comprising:
outputting one of a first list of the stored image data in the first display form and a second list of the stored image data in a second display form in accordance with a first input instruction, the first list of the stored image data including a first type of information for each piece of image data included in the first list, and the second list of the stored image data including said first type of information for each piece of image data included in the second list, one of the first list and the second list includes additional information, other than said first type of information, that is not included in the other of the second list and the first list;

displaying the output one of the first and second lists in a window; and when switching from the outputting of the one of the first and second lists to outputting of the other in accordance with a second input instruction, displaying the other of the first and second lists so that a piece of image data, which is displayed at a particular position in a previous display form, is displayed at a particular position in a current display form, wherein when only one piece of image data included in the one of the first and second lists, located at other than a first position of the one of the first and second lists, and displayed on the previous display form is selected and there is switching from outputting the one of the first and second lists to outputting the other in accordance with the second input instruction, the other of the first and second lists is displayed so that the selected piece of image data is displayed at the first position in the current display form, and the first display form is the display of said each piece of the image data in list form and the second display form is the display of said each piece of image data in thumbnail image form, and when (i) a certain piece of image data included in the first list and located at the other than the first position of the first list is selected and (ii) the outputting of the first list in the list form is switched to outputting the second list in the thumbnail image form, the second list in the thumbnail form is displayed so that the selected certain piece of image data is displayed at a top-left position or a top-right position in the window as the first position in the thumbnail form.

10. The method according to claim 9, wherein:
the particular position in the previous display form is a first position in the one of the first and second lists, and
the particular position in the current display form is a first position in the other of the first and second lists.

11. The method according to claim 9, wherein:
the first list includes only said first type information for said each piece of image data, and
the second list includes the said first type information for said each piece of image data and the thumbnail image for said each piece of image data.

12. The method according to claim 9, wherein
when switching from the outputting of the one of the first and second lists to outputting of the other in accordance with the second input instruction, displaying the other of the first and second lists so that number of pieces of image data in a previous display form is equal to number of pieces of image data in a current display form when one of the first and second lists overflows a range of displayable viewing area.

13. An image processing method for switching a list of plural pieces of stored image data between a first display form and a second display form, the method performed by a processor device, each piece of image data corresponding to one image, the method comprising:

outputting one of a first list of the stored image data in the first display form and a second list of the stored image data in the second display form in accordance with a first input instruction, the first list of the stored image data including a first type of information for each piece of image data included in the first list, and the second list of the stored image data including said first type of information for each piece of image data included in the second list, one of the first list and the second list includes additional information, other than said first type of information, that is not included in the other of the second list and the first list;

displaying the output one of the first and second lists in a window; and when switching from the outputting of the one of the first and second lists to outputting of the other in accordance with a second input instruction, displaying the other of the first and second lists so that image data, which is selected in a previous display form, is displayed at a particular position in a current display form, wherein when only one piece of image data included in the one of the first and second lists, located at other than a first position of the one of the first and second lists, and displayed on the previous display form is selected and there is switching from outputting the one of the first and second lists to outputting the other in accordance with the second input instruction, the other of the first and second lists is displayed so that the selected piece of image data is displayed at the first position in the current display form, and the first display form is the display of said each piece of the image data in list form and the second display form is the display of said each piece of image data in thumbnail image form, and when (i) a certain piece of image data included in the first list and located at the other than the first position of the first list is selected and (ii) the outputting of the first list in the list form is switched to outputting the second list in the thumbnail image form, the second list in the thumbnail form is displayed so that the selected certain piece of image data is displayed at a top-left position or a top-right position in the window as the first position in the thumbnail form.

* * * * *